No. 11,762. Reissued Aug. 1, 1899.
R. CROMPTON & H. WYMAN.
LOOM.
(Application filed May 5, 1899.)
5 Sheets—Sheet 1.
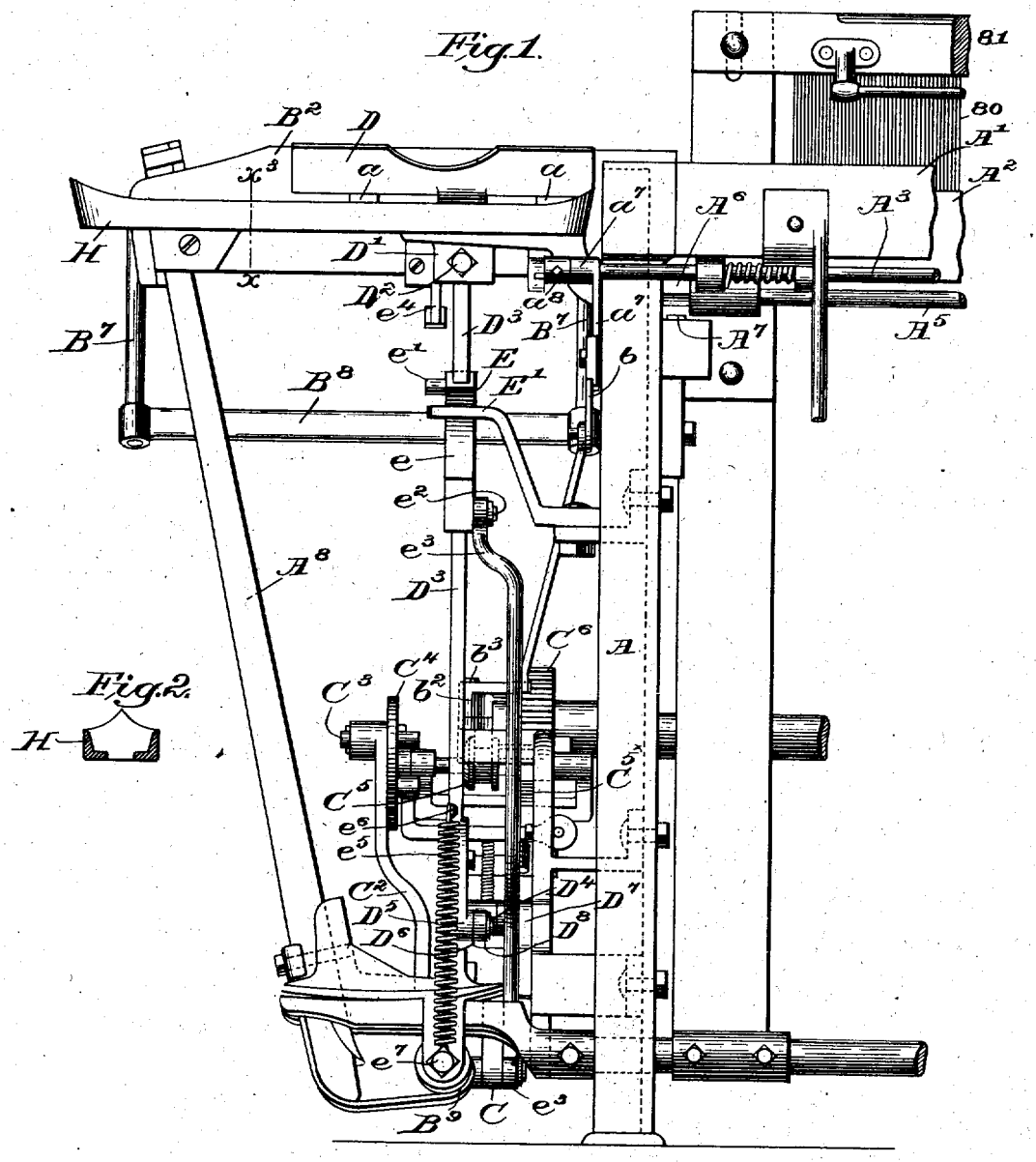
Witnesses.
Thomas J. Drummond,
Gustave F. Magnitzky.
Inventors.
Randolph Crompton.
Horace Wyman.
by Crosby & Gregory. Att'ys.
THE NORRIS PETERS CO., PHOTO-LITHO., WASHINGTON, D. C.

No. 11,762.
Reissued Aug. 1, 1899.
R. CROMPTON & H. WYMAN.
LOOM.
(Application filed May 5, 1899.)
5 Sheets—Sheet 2.
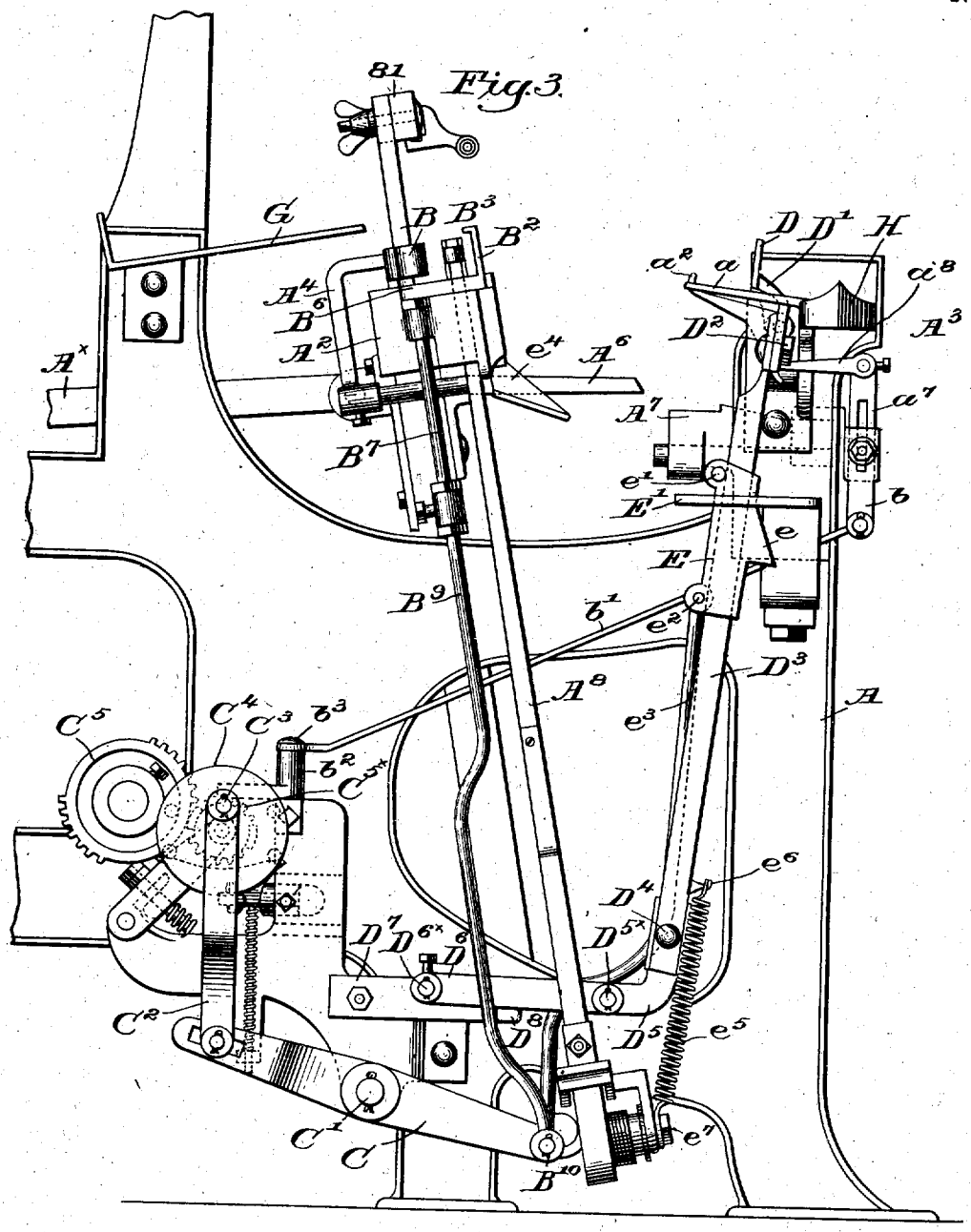
Witnesses.
Thomas J. Drummond
Gustave F. Magnitzky
Inventors.
Randolph Crompton.
Horace Wyman.
by Crosby & Gregory.
Att'ys.
THE NORRIS PETERS CO., PHOTO-LITHO., WASHINGTON, D. C.

No. 11,762.
Reissued Aug. 1, 1899.
R. CROMPTON & H. WYMAN.
LOOM.
(Application filed May 5, 1899.)
5 Sheets—Sheet 3.
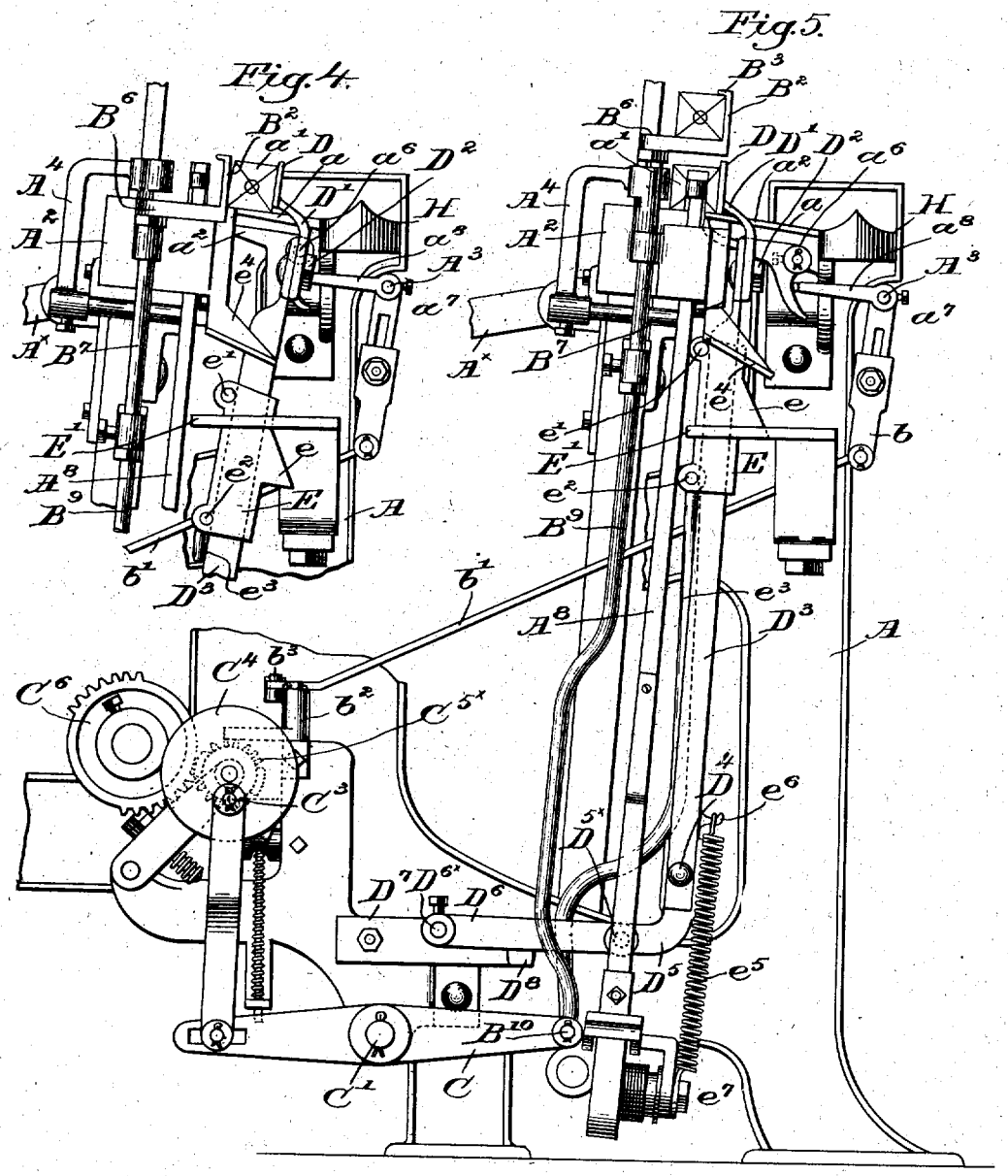
Witnesses:
Thomas J. Drummond
Gustave F. Magnitzky
Inventors:
Randolph Crompton,
Horace Wyman,
by Crosby Gregory
Atty's.
THE NORRIS PETERS CO., PHOTO-LITHO., WASHINGTON, D. C.

No. 11,762. Reissued Aug. 1, 1899.
R. CROMPTON & H. WYMAN.
LOOM.
(Application filed May 5, 1899.)
5 Sheets—Sheet 4.
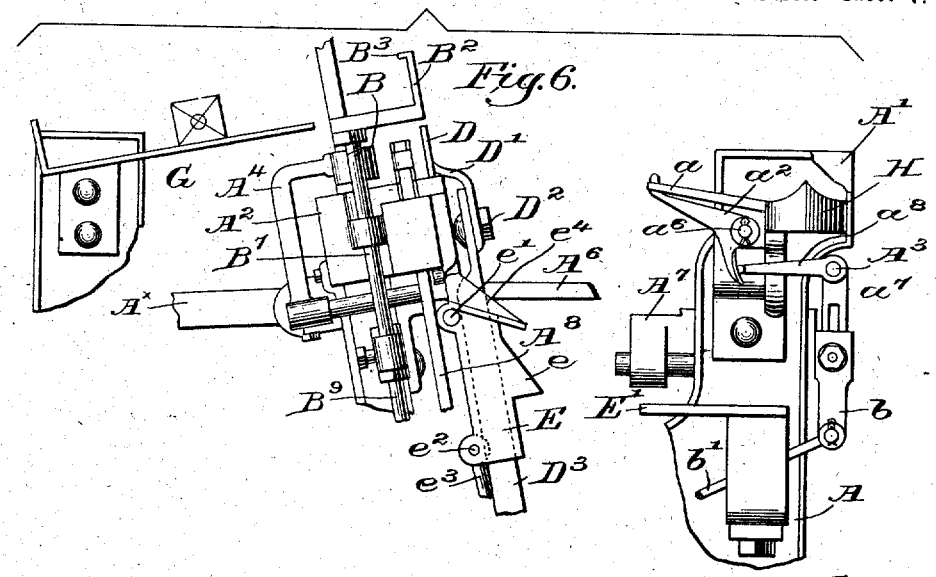
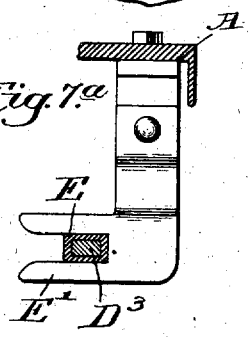
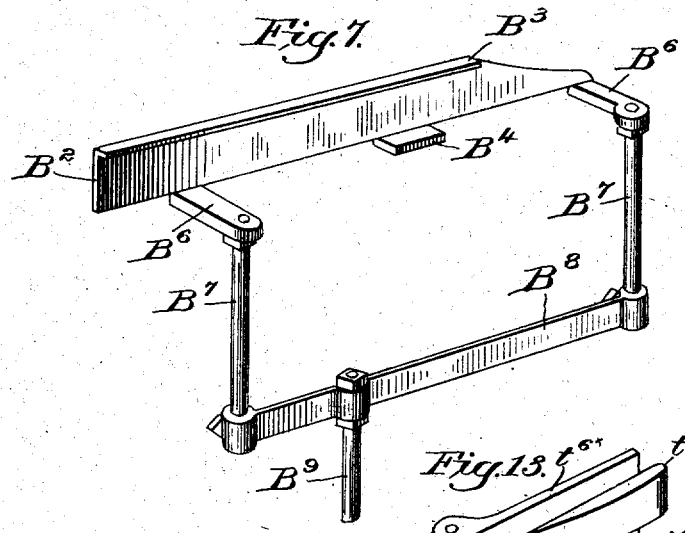
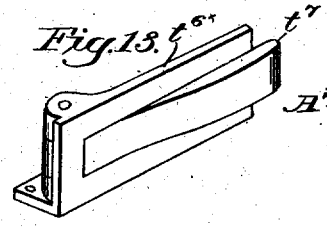
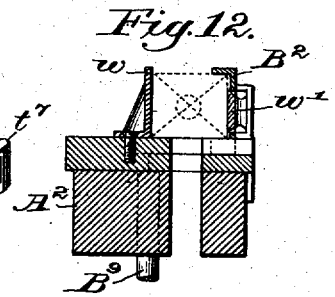
Witnesses:
Thomas J. Drummond.
Gustave F. Magnitzky.
Inventors:
Randolph Crompton.
Horace Wyman.
by Crosby & Gregory, Attys.
THE NORRIS PETERS CO., PHOTO-LITHO WASHINGTON, D. C.

No. 11,762. Reissued Aug. 1, 1899.
R. CROMPTON & H. WYMAN.
LOOM.
(Application filed May 5, 1899.)
5 Sheets—Sheet 5.
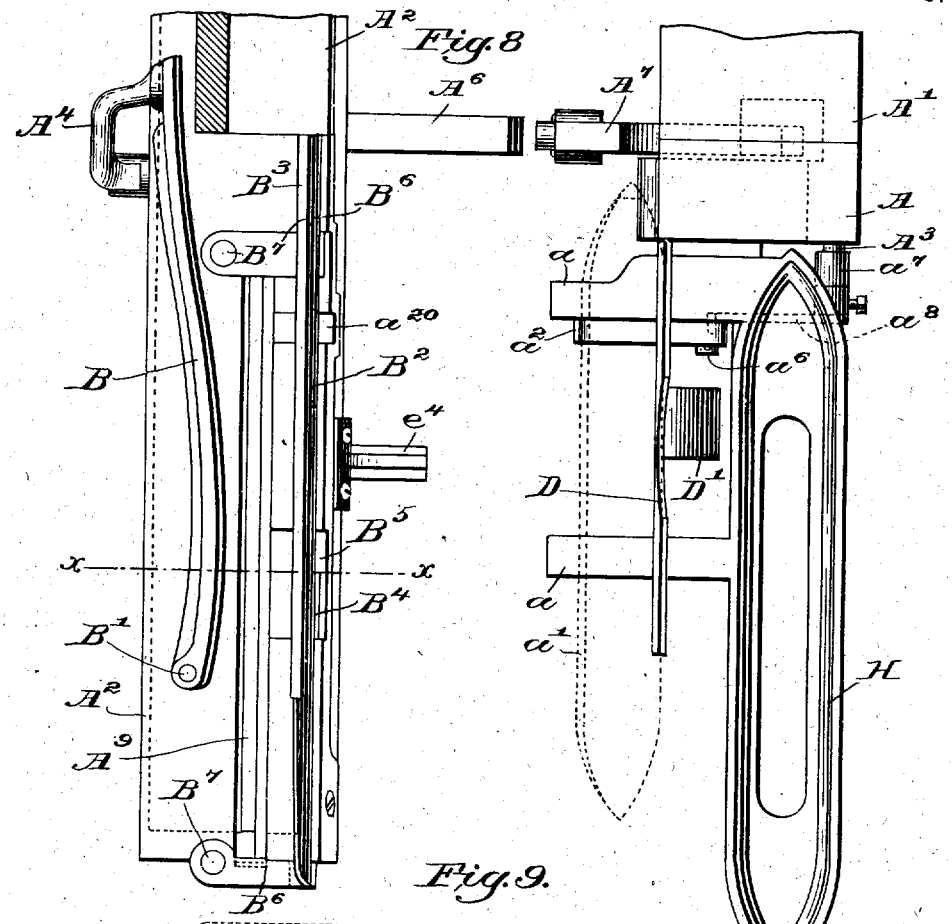
Fig. 9.
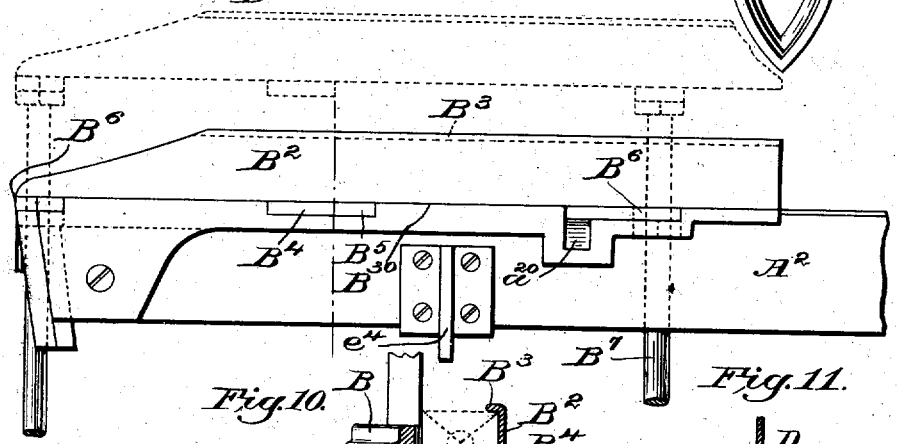
Fig. 10.
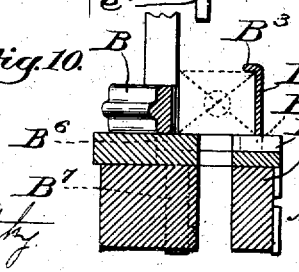
Fig. 11.
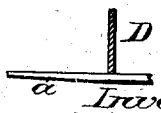
Witnesses.
Thomas J. Drummond,
Gustave F. Magnitzky
Inventors.
Randolph Crompton.
Horace Wyman.
By Crosby & Gregory, Att'ys.
THE NORRIS PETERS CO., PHOTO-LITHO., WASHINGTON, D. C.

UNITED STATES PATENT OFFICE.

RANDOLPH CROMPTON AND HORACE WYMAN, OF WORCESTER, MASSACHUSETTS, ASSIGNORS TO THE CROMPTON & KNOWLES LOOM WORKS, OF SAME PLACE.

LOOM.

SPECIFICATION forming part of Reissued Letters Patent No. 11,762, dated August 1, 1899.

Original No. 615,532, dated December 6, 1898. Application for reissue filed May 5, 1899. Serial No. 715,722.

*To all whom it may concern:*

Be it known that we, RANDOLPH CROMPTON and HORACE WYMAN, of Worcester, county of Worcester, and State of Massachusetts, have invented an Improvement in Looms, of which the following description, in connection with the accompanying drawings, is a specification, like letters and numerals on the drawings representing like parts.

This invention is intended as an improvement upon the class of looms represented in United States Patents Nos. 600,489 and 600,490, dated March 8, 1898.

The loom to be herein described has a lay provided with a running-shuttle box composed, essentially, of a substantially vertical side wall next the front side of the lay, (the side nearest the breast-beam,) said wall being shown as provided at or near its upper and lower edges with lips extended backwardly toward the rear side of the lay and the crank-shaft, the lip at the lower edge of said wall serving to lift the shuttle when the running-shuttle box is to be put into its inoperative position, the lip at the upper edge of said wall serving to retain the shuttle in line with the race of the lay so long as said shuttle (it being supplied with filling) is running regularly, the side of the shuttle opposite that acted upon by the side wall of the running-shuttle box being guided and retained in operative position by means of a wall carried by the lay and located at the top of the lay, at the rear side of the usual picker-stick slot of the lay; and said wall may be pivoted at one end on the lay and also serve as the binder for the running-shuttle box. This running-shuttle box will be moved automatically to put it into its inoperative position whenever the filling fails in the shuttle controlled by it, the movement of said running-shuttle box into its inoperative position being effected on the failure of said filling through any usual or suitable devices under the control of any usual filling-stop-motion mechanism, said filling-stop-motion mechanism causing devices—for instance, devices such as are commonly employed for actuating drop or shifting shuttle-boxes—to start into operation and move the said running-shuttle box into its inoperative position. When the running-shuttle box is lifted after the failure of the filling in the shuttle controlled by it, the shuttle in said box (it having been returned into said box after the filling-stop-motion mechanism, located, as usual, at the opposite side of the loom, has been operated) is by the upward movement of said shuttle-box carried above the wall or binder referred to as mounted on the lay, and immediately thereafter (the lay at such time being on its back stroke) the said shuttle escapes or passes out from said running-shuttle box over the top of said binder, it lodging upon a suitable shelf or receptacle located at the loom side.

In the Patent No. 600,490 referred to we have shown an auxiliary-shuttle presenter normally held in its inoperative position next the breast-beam, and in the particular manner in which we have therein illustrated said shuttle-presenter it occupies when in its inoperative position a position somewhat below the level of the raceway of the lay, and when coming into its operative position to place its auxiliary or spare shuttle in position to be thrown therefrom across the lay it is somewhat elevated as it is swung forward toward the lay; but herein the auxiliary-shuttle presenter when in its inoperative position occupies a position above the level of the race of the lay, so that in coming from its inoperative into its operative position it is simply moved in a forward direction, taking said shuttle with it, and having met the lay is locked thereto through devices to be described, so that said shuttle-presenter follows the lay in its next back stroke, during which time the auxiliary or spare shuttle is thrown from between the upright wall of the shuttle-presenter and a wall carried by the lay and rising from a table or horizontal alining-surface at the rear side of a picker-slot in which works the picker-stick, and the running-shuttle box (it having the failed shuttle) is at the same time put into its inoperative position to discharge the running shuttle.

The shuttle-presenting device is composed, essentially, of a substantially upright wall to act against the auxiliary or spare shuttle sustained at one side of said wall on a suitable rest or support, preferably stationary, and having its inner ends next the lay preferably so shaped as to enter a suitable recess at the top of the horizontal table or alining-surface of the lay as the latter completes its forward stroke, said rest acting as a bridge over which the shuttle is passed onto the top of the lay. When the shuttle-presenter is actuated to put the shuttle then under its control onto the lay, the running-shuttle box is in its described elevated or inoperative position, and the rear side of the auxiliary or spare shuttle is pressed against the wall or binder referred to, so that one and the same wall and binder acts in controlling the direction of flight of the shuttle being used.

The auxiliary-shuttle presenter is attached, as herein shown, to the upper end of a lever, which may and preferably will be suitably pivoted near or in line with the pivotal point of the lay, and to effect the forward movement of this lever with the shuttle-presenter we have combined with the means herein shown to effect the raising of the running-shuttle box a shoe or device which is raised in unison with the running-shuttle box, said shoe or device in its movements swinging said lever about its pivot toward and to meet the lay, a projection connected with or forming a part of said shoe as it rises coöperating with a suitable hook or projection carried by the lay to thus lock the shoe, and with it the lever carrying the auxiliary-shuttle presenter, to the moving lay and hold it in place at the race of the lay until the shuttle put on the lay by said presenter has been thrown therefrom onto the lay. This invention is not, however, to be limited to the particular shape of the shoe or moving device employed to act upon and turn the lever and its connected shuttle-presenter.

The shuttle is thrown from between the shuttle-presenter and the rear wall or binder of the lay across the race of the lay at a back stroke of the lay, and thereafter the lay and shuttle-presenter are moved forward in unison, so that the usual reed of the lay may beat in the first shot of filling from the shuttle just supplied to the lay, and during said forward stroke said shoe is lowered and the auxiliary-shuttle presenter is permitted to retire from the lay under the action of a suitable spring, and at the same time the running-shuttle box is again dropped or put into its operative position, so that as the lay next reaches its back stroke the shuttle just put onto the lay by the shuttle-presenter is received in the running-shuttle box.

The particular features of which our invention consists will be hereinafter more fully described and will be defined in the claims at the end of this specification.

Figure 1 is a partial front side elevation showing part of the left-hand end of a loom containing our invention. Fig. 2 is a detail showing the shuttle-holder H in section in the dotted line $x^3$ of Fig. 1. Fig. 3 is a view of the left-hand end of the loom, the lay being back with the running-shuttle box in its operative position and the auxiliary-shuttle presenter in its inoperative position. Fig. 4 is a partial view of the left-hand end of the loom, showing the lay on its forward stroke and the running-shuttle box in its operative position, the auxiliary-shuttle presenter occupying its inoperative position. Fig. 5 is a view of the same parts, showing the running-shuttle box in its inoperative position on its front stroke and the auxiliary-shuttle presenter as coming into its operative position, said figure also showing the devices instrumental in moving the running-shuttle box up and down. Fig. 6 shows a part of the lay and running-shuttle box and part of the loom-frame at the breast-beam, the lay being on its back stroke, with the shuttle-presenter in its operative position at the lay, the running-shuttle box being in its inoperative position, said figures showing the failed shuttle as having been discharged from the running box. Fig. 7 is an enlarged detail of the inner side of the running-shuttle box. Fig. $7^a$ is a detail showing in plan view the guide or stand projected from the loom side to guide the lever carrying the auxiliary-shuttle presenter and its coöperating actuating device. Fig. 8, on an enlarged scale, shows the end of the lay, the guide-wall or binder pivoted thereon, and the running-shuttle box carried by the lay, together with the part of the breast-beam and the auxiliary-shuttle presenter occupying its inoperative position. Fig. 9 shows in elevation a part of the lay, looking at the same from the breast-beam, the running-shuttle box being shown by full lines in its operative position and by dotted lines in its inoperative position, the lay being cut away to receive the shelf or projection on which normally stands the auxiliary or spare shuttle. Fig. 10 is a section of the lay and binder in the line $x$, Fig. 8. Fig. 11 is a section of the auxiliary-shuttle presenter in the line $x$, Fig. 8, continued, said figure showing part of the rest. Fig. 12 shows a modification to be described, and Fig. 13 yet a further modification.

The loom-frame A, the breast-beam A′, the reed 80, carried by the lay, and the reed-cap 81, the arms $A^{\times}$ of the lay to be attached to the usual crank-shaft (not shown) by which to move the lay, the rock-shaft $A^8$, contained in suitable bearings below the breast-beam and deriving its rocking motion by or through any usual filling-fork—such, for instance, as shown in said Patent No. 600,490—which may be moved backwardly on the failure of the filling in the shed, the binder-finger $A^4$, carried by a binder-shaft $A^5$, suitably supported in usual bearings under the lay and having a dagger or finger $A^6$ coöperating with a shoe $A^7$ to knock off the loom and stop the same in the absence of a shuttle against which the binder may work as the lay goes forward, are and may be all as common in any usual loom and need not, therefore, be herein further described.

In the patents hereinbefore referred to the spare or auxiliary shuttle has been laid on a shuttle-support forming part of the spare or auxiliary shuttle presenter or feeder, and when a shuttle has been thrown from said auxiliary-shuttle presenter or feeder said support has been put in line with the level of the race of the lay, and the auxiliary or spare shuttle, acted on by a picker, has been thrown from said support longitudinally across the raceway of the lay through the shed.

In another patent, No. 614,369, dated November 15, 1898, we have shown the ends of the raceway of the lay extended to support a running-shuttle box, and said extension is represented as slotted for the reception of a vertical picker-stick, which may be of usual construction; but in said patent the spare-shuttle feeder has a shelf or support to sustain the spare shuttle, and said shelf or support was in practice laid over the extension of the lay to put the spare shuttle in line with the raceway of the lay.

In the present invention the lay is extended at its ends, and is in said Patent No. 614,369; but herein it has been provided with a table which constitutes a permanent horizontal alining-surface always occupying a position level with the upper face of the raceway of the lay, said alining-surface receiving directly upon it and sustaining the under side of the shuttle being thrown as the running shuttle, thus alining it with the race of the lay, and said alining-surface also receives directly upon it the auxiliary shuttle as the latter is being put in position to be thrown through the shed to be thereafter actuated as the running shuttle.

The picker-stick may be swung in the slot of the horizontal alining-surface to throw the shuttle by or through any usual or suitable devices, and we shall not hereinafter describe such devices.

In the preferred form of our invention a binder B is pivoted at B′ on top of the horizontal alining-surface of the lay at that side of the picker-slot $A^9$ next the rear side of the lay, and the binder-finger $A^4$ acting upon it normally keeps the said binder pressed toward said picker-slot, causing said binder to contact with the side of the shuttle lying on and supported wholly by said horizontal alining-surface of the lay and press it against the alining side or wall of the running-shuttle box, said binder acting in like manner against the side of the auxiliary shuttle when put by the auxiliary-shuttle presenter directly upon said horizontal alining-surface level with the race of the lay whichever shuttle is operative at the time, the under side of both shuttles resting at such times directly upon the horizontal alining-surface of the lay. The shuttles have also to be alined with the faces of the dents of the reed 80 before they are thrown, and in the construction Figs. 1 to 10 the walls of the running-shuttle box and of the auxiliary-shuttle presenter constitute these necessary alining-surfaces.

The running-shuttle box in the present instance of our invention is represented detached in Fig. 7, where it is shown as composed of a substantially solid or unyielding front wall $B^2$, having at its upper edge a lip $B^3$, which is extended horizontally therefrom toward the rear side of the lay, the under edge of said wall having a second lip $B^4$, which when the said running-shuttle box is in its operative position enters a slot $B^5$ in a table $B^{30}$, applied to the extension of the lay, it constituting the horizontal alining-surface herein referred to, it standing at the level of the upper side of the lay, as best represented in Fig. 9, so that the upper edge of said lip $B^4$ rests substantially flush with or it may be a little below said table or horizontal alining-surface $B^{30}$. The lower edge of the binder-wall $B^2$ is also provided with ears $B^6$, extended laterally therefrom or connected thereto in suitable manner, one of said ears lying in a suitable slot $B^{5\times}$ as the ear $B^4$ lies in the slot $B^5$ in the lay, while the other arm crosses the end of said table, said ears $B^6$ being attached to rods $B^7$, in turn attached to a cross-bar $B^8$, to which is connected a rod $B^9$, the lower end of said rod being jointed at $B^{10}$ to a lever C, pivoted at C′ and having connected to it at its opposite end a link $C^2$, attached to a suitable crank, as $C^3$, carried by a disk $C^4$, which may be moved intermittingly a half-rotation at a time by or through a collar $C^5$, having arms provided with teeth which may be put into line with the teeth of a mutilated gear $C^{5\times}$, so that a continuously-rotating gear $C^6$, having a plurality of series of teeth, may engage the teeth of said arms and start and turn them from the position Fig. 3 into the position Fig. 5, leaving it there for an instant, or while the auxiliary-shuttle presenter occupies its operative position at the level of the race of the lay and the running-shuttle box is in its inoperative position above the level of the race of the lay, and thereafter the said crank is again immediately started and is taken from the position Fig. 5 into the position Fig. 3, (the position in which it normally stands when the loom is running regularly.)

We shall not herein specifically describe the means for raising and lowering the rod $B^9$, as instead of the particular means herein represented and partially described, the sliding toothed gear $C^5$ being old and common, we may use any usual, suitable, or well-known means commonly employed to effect the raising and lowering of shuttle-boxes in looms, and by the term "box-operating mechanism" we intend to include any such usual devices, the particular devices employed not being of the gist of this invention.

The auxiliary-shuttle presenter D is composed, essentially, of a solid or unyielding wall having, as represented, a shank D′, suitably attached, as by a bolt $D^2$, to the upper end of a lever $D^3$, said lever being herein represented as held by a suitable bolt $D^4$ in an open guideway of a short arm $D^5$, pivoted at $D^{5\times}$ at one end of a link $D^6$, pivoted at $D^{6\times}$ on a suitable stand $D^7$, bolted to the loom side, said stand having a lip or projection $D^8$, on which the said link $D^6$ normally rests. The lever $D^3$ has coöperating with it and preferably sliding on it a shoe or device E, having, as shown, an inclined or wedge-shaped projection *e*, said shoe being shown in Fig. 7ª as surrounding said lever, the wedge entering an open slot in a stand or arm E′, bolted to the loom side in any usual or suitable manner. The upper end of this shoe has a projection *e′*, and its lower end has a bolt $e^2$, embraced by a rod $e^3$, jointed in this instance of our invention to the stud $B^{10}$, (the same stud which connects the rod $B^9$ with the lever C,) so that as the said lever C is moved to raise the rod $B^9$ and the running-shuttle box the shoe E is also raised from the position Fig. 3, and during the time that it so rises the wedge *e*, acting in the slot of the arm E′, causes the said lever to be swung to the left, viewing Fig. 3, toward the then advancing lay, and the running-shuttle box is elevated into its inoperative position, leaving below its front wall an open space in which the auxiliary-shuttle presenter enters, pushing the auxiliary shuttle before it, so that said spare shuttle enters the space so made below the elevated front wall and acts to press said auxiliary shuttle against the rear wall of the lay, as shown in Fig. 5, by the time the lay completes its forward stroke, and at such time it will be noticed, viewing Fig. 5, that the projection *e′*, connected with said shoe or device, has passed under the lower side of the inclined hook or holding projection $e^4$ of the lay, said holding projection insuring the locking of the auxiliary-shuttle presenter to the lay, so that it moves backwardly therewith, it remaining connected with the lay until the lever C is again moved from the position Fig. 5 into the position Fig. 3.

A spring, as $e^5$, connected with the stud $e^6$ of the lever $D^3$ and at its lower end to some fixed or other stud $e^7$, normally acts to keep the lever $D^3$ down and prevent it from rising, the auxiliary-shuttle presenter connected with the upper end of said lever moving simply in the arc of a circle nearly coincident with the circle in which the lay moves, so that the auxiliary or spare shuttle laid on a suitable rest *a*, composed, preferably, of two independent fingers, in the movement of said auxiliary-shuttle presenter toward the race of the lay slips the spare shuttle (represented by dotted lines in Fig. 8) from said rest onto the said table or horizontal alining-surface, level with the top of the lay in the position, as herein shown, below the running-shuttle box then in its inoperative position.

When the loom is running regularly, the running-shuttle box occupies the position shown in Figs. 3 and 4, and the lever C is in the position Fig. 3; but as soon as the filling-stop-motion mechanism is operated by the backward movement of any usual filling-fork the rod $A^3$ is partially turned, moving with it the connected lever *b*, causing it, through the rod *b′*, connected with the bell-crank $b^2$, mounted on a stud $b^3$, to move one arm of said bell-crank, so that said arm, entering the annular groove in the exterior of the collar $C^5$, having the toothed arms before referred to, causes one of said teeth to come into a space of the partial gear $C^{5\times}$ to be engaged by the teeth of the gear $C^6$, causing the latter to impart a semirotation to the disk $C^4$, carrying the crank $C^8$, and said disk will remain at rest for a space equal to the distance between the two sets of teeth of the gear $C^6$, when it will be again taken up and rotated by said gear a half-rotation, putting the lever C again into its starting position, Fig. 3. The lever C will not be moved to elevate the running-shuttle box until after the filling-stop-motion mechanism has operated, due to the absence of filling in the shed; but as soon as the failed shuttle arrives back in the running-shuttle box then the lever C will be started, as described, and will lift the running-shuttle box into the position Fig. 5, so that as the lay comes forward the auxiliary-shuttle presenter may be moved toward and to meet the lay and remove the spare or auxiliary shuttle from the rest *a* and put it onto the horizontal alining-surface of the lay against the binder B, (the same binder which coöperated with the shuttle controlled by the running-shuttle box when in its operative position.) The auxiliary-shuttle presenter having arrived in the position Fig. 5, the lay will be moved backwardly, and at that back stroke the shuttle having the failed filling and resting in the running-shuttle box then in its inoperative position will be thrown across the top of the wall or binder mounted on the lay onto the shelf G, connected with the loom end A, and at the same time the picker-stick will operate and will throw the auxiliary or spare shuttle then lying on the said table or horizontal alining-surface of the lay between the wall of the auxiliary presenter and the rear wall or the binder B, pivoted on the lay at the rear side of the picker-stick slot across the loom into the opposite box, and the lay will be immediately started forward; but during this forward movement the lever C will be again moved, this time from the position Fig. 5 into the position Fig. 3, so that the shoe or device E will be lowered, permitting the spring $e^5$ to act and withdraw the auxiliary-shuttle presenter from its operative position at the top of the lay, and the running-shuttle box will be again lowered into its operative position, and the lay will be again started back, leaving the auxiliary-shuttle presenter in its inoperative position, Fig. 3, at the breast-beam, and by the time that the shuttle just thrown from between the auxiliary-shuttle presenter and the back wall of the lay (across the horizontal alining-surface of the lay) comes back it enters the running-shuttle box then in position at the level of the race of the lay, and the shuttle will continue to be thrown from the running-shuttle box and from between its vertical wall and the rear wall or binder B until the filling again fails in said shuttle, when the operation just described will be repeated.

To prevent the auxiliary or spare shuttle from escaping accidentally from the rest $a$, we have provided a retaining device, shown as a hooked lever $a^2$, pivoted at $a^6$ and having a curved end $a^7$, against which acts a small lug at the end of an arm $a^8$, fixed to one end of the filling stop-motion shaft $A^3$, so that when the loom is running regularly the said arm will stand in the position Fig. 3, with the end of the hooked lever $a^2$ above the rest $a$; but when the said rock-shaft $a^8$ is turned into the position Fig. 5, a spring connected with the said lever $a^2$ turns it, so that the projecting end of said lever is put below the top surface of the rest $a$, letting the shuttle pass freely therefrom.

The ends of the rest $a$ are of sufficient length, preferably, to enter the notches $B^5$ and $B^{5\times}$, referred to, in the table $B^{30}$, applied to the extension of the race of the lay, said notches being wide enough for such purpose, so that there will be no gap or space against which the edge of the shuttle may strike when passing onto the top of the lay, and said table also has a notch $a^{20}$, in which enters the hooked end of the lever $a^2$ as the lay comes forward.

The filling-fork mechanism may be that commonly employed in the Patent No. 600,490, referred to, or in usual looms.

The operator for convenience may lay a second spare shuttle on the holder H, connected with the loom end, so that when the auxiliary-shuttle presenter has moved to take the shuttle (shown by dotted lines, Fig. 8) and put it on the horizontal table or alining-surface of the lay the operator may without any effort take the shuttle from the said holder H and lay it upon the rest $a$ as soon as the auxiliary-shuttle presenter again comes back into its inoperative position.

The top of the table $B^{30}$, between the notches $B^5$ and $B^{5\times}$, presents an alining-surface located at the level of the raceway of the lay, said alining-surface sustaining the under side of the shuttle as it comes to that end of the lay and goes out again, that end of the lay constituting the bottom of a shuttle-box.

In Fig. 12 we have shown a part of the lay with an upright wall $w$ at the rear side of the picker-slot instead of the binder, said wall constituting a shuttle-alining surface for the back of the shuttle, and in such case the wall of the running-shuttle box will be provided with a binder $w'$, and the wall of the shuttle-presenter may be substantially as shown in said Patent No. 600,490.

In Fig. 13 we have shown yet another modification, wherein the lay has at the rear side of the vertical picker-slot a wall $t^6$, provided with a binder $t^7$; and with such a wall the running-shuttle box may be as shown in Fig. 3.

Any of the described forms of walls or binders may be used with a running-shuttle box open at its rear side for the discharge of the shuttle.

Herein it will be noticed that the auxiliary-shuttle presenter occupies such position with relation to the horizontal alining-surface of the lay that when said presenter is actuated its movement is in a substantially horizontal line instead of in a line the resultant of a vertical and horizontal movement, as in the patents hereinbefore referred to.

Having described our invention, what we claim as new, and desire to secure by Letters Patent, is—

1. In a loom, a lay having a reed, and a binder mounted on the lay substantially in the line of the dents of the reed, combined with a running-shuttle box carried by and movable on said lay from its operative into its inoperative position and vice versa, said shuttle-box being open at its rear side next said binder, the vertical wall of said shuttle-box being located parallel to the faces of the dents of the reed and in front of the same to constitute an alining-surface for the shuttle acted on by said binder, and means to actuate said running-shuttle box to put it into its inoperative position and enable the escape of its shuttle from the rear side of said box over said binder, substantially as described.

2. In a loom, a lay having at its end a horizontal alining-surface coincident with the level of the race of the lay to aline the shuttle with said raceway, said surface sustaining the under side of the shuttle carried by the lay and being slotted for the reception of a picker-stick, and a wall mounted on said lay at the rear side of said slot, combined with a running-shuttle box open at its rear side and located at the opposite side of said slot, and means to move said shuttle-box to enable the shuttle to escape therefrom across said wall, substantially as described.

3. A lay having at its end a horizontal slotted alining-surface coincident with the level of the raceway of the lay, a running-shuttle box open at its rear side, a vertical wall mounted on the top of said lay opposite the open side of said running-shuttle box, a picker-stick movable back and forth in said slot between said wall and the open side of said running-shuttle box, and means to lift said running-shuttle box in said lay when the shuttle is to be changed, said shuttle-box as its open side is lifted above said wall enabling the shuttle to leave the open rear side of said running-shuttle box and be discharged from the lay, substantially as described.

4. In a loom, a lay having a picker-stick slot at its end, a vertical wall at the rear side of said slot, and a running-shuttle box presenting a vertical front wall; combined with an auxiliary-shuttle presenter, and a separate rest or support for an auxiliary shuttle, said presenter acting against the side of said spare shuttle opposed to the vertical wall of the lay, means to move the vertical wall of said running-shuttle box from its operative into its inoperative position and the said auxiliary-shuttle presenter from its inoperative into its operative position, both the said running-shuttle box and said shuttle-presenter coöperating with and pressing its shuttle against one and the same vertical wall of the lay when the shuttle is being thrown across the lay, substantially as described.

5. In a loom, the following instrumentalities, viz: a lay having a pivoted binder, a running-shuttle box open at its side next said binder and coöperating therewith when said shuttle-box is in its operative position at the level of the race of the lay, means to move said running-shuttle box into its inoperative position to take with it the shuttle to be discharged from the open side of the said shuttle-box, combined with an auxiliary-shuttle presenter composed of a wall and a lever carrying it, said shuttle-presenter being normally held stationary in its inoperative position, and means to move said shuttle-presenter into its operative position at the level of the race of the lay and put the shuttle carried by it against said binder to be thrown from between said shuttle-presenter and said binder across the lay, and means to lock said shuttle-presenter to the lay, while the auxiliary shuttle is being thrown by the picker onto the lay, substantially as described.

6. In a loom, a lay having a slot for a picker-stick, a binder pivoted on said lay to move toward and from said slot and act on the shuttle, a running-shuttle box composed of a wall provided at its upper and lower edges with short horizontal lips extended toward the rear side of the lay and said binder, said lips overlapping a portion of the upper and lower sides of the shuttle, said wall keeping said shuttle against said binder combined with means to move said shuttle-box transversely with relation to said binder to effect the discharge of a shuttle, substantially as described.

7. In a loom, the following instrumentalities, viz: a lay, a running-shuttle box carried thereby and open at its rear side, means to move said shuttle-box into its inoperative position when the shuttle is to be discharged therefrom, a lever having an auxiliary-shuttle presenter attached to it, said shuttle-presenter being normally held in its inoperative position near the breast-beam, independent devices operated by the means employed to put said running-shuttle box into its inoperative position, said independent means coöperating with and turning said lever carrying said shuttle-presenter about its pivot to place the said auxiliary shuttle in the position previously occupied by the running-shuttle box at the level of the race of the lay while the spare shuttle supported by said lay is thrown therefrom across the lay, substantially as described.

8. A lay, a rest for an auxiliary or spare shuttle, a hooked lever to engage and retain said shuttle in stationary position on said rest, combined with an auxiliary-shuttle presenter to remove said shuttle from said rest onto said lay, and means to operate said hooked lever and enable said shuttle to pass off from said rest onto the lay, substantially as described.

9. A lay, a rest for an auxiliary or spare shuttle, a hooked lever to engage said shuttle, and an auxiliary-shuttle presenter adapted to remove said shuttle from said rest onto said lay, combined with a filling-fork stop-motion shaft and means under its control to meet and turn said hooked lever, substantially as described.

10. In a loom, a lay having a table or horizontal alining-surface slotted for a picker-stick, and having a recess, and a binder carried by said lay at one side of and adapted to move toward and from said slot; combined with a running-shuttle box open at its rear side and located at the opposite side of said picker-slot, said running-shuttle box having a lip at its upper edge to overlap a part only of the upper edge of the shuttle, and a second lip to act on the under side of said shuttle to lift it from the lay, said second lip standing in the said recess, and means to move said shuttle-box transversely with relation to said binder, substantially as described.

11. The lay, a lever, and an auxiliary-shuttle presenter carried thereby, a shoe having an inclined or cam surface, and a guide for said shoe, combined with means to move said shoe to effect the movement of said lever about its pivot, substantially as described.

12. The lay, its attached holding projection, an auxiliary-shuttle presenter mounted upon a lever, a device movable independently of said lever and having a wedge or cam surface and a projection, combined with means to move said device to turn said lever, said device engaging the projection of said lay to lock the said lever to said lay, substantially as described.

13. In a loom, the following instrumentalities, viz: a lay, a running-shuttle box carried thereby and open at its rear side and occupying normally its stationary operating position, a lever, and an auxiliary-shuttle presenter actuated therewith and occupying normally a stationary inoperative position in line with the level of the race of the lay, means to move said running-shuttle box, and independent means set in motion by the movement of said running-shuttle box to coöperate with and move the lever carrying said auxiliary-shuttle presenter toward and to meet the forwardly-moving lay, substantially as described.

14. A rest for an auxiliary or spare shuttle, a lever, an auxiliary-shuttle presenter actuated thereby, and a device coöperating with said lever and provided with an inclined or cam surface, combined with means to guide said device, and move it to thereby effect the turning of said lever upon its fulcrum, substantially as described.

15. In a loom, a lay having a horizontal alining-surface notched at its top, a stationary rest extended from the front of the loom toward the lay and adapted to coöperate with the notches in the top of the lay as the latter reaches the end of its forward stroke toward the breast-beam, combined with an auxiliary-shuttle presenter occupying its inoperative position above said rest at one side of the auxiliary shuttle thereon when the loom is running regularly, means on the failure of the filling in the running-shuttle box to move said shuttle-presenter and cause it to move the auxiliary shuttle over said rest onto the lay, a movable shoe, and means to move it to cause said auxiliary-shuttle presenter to be moved toward and be locked to the lay, and thereafter move with the lay while the said auxiliary shuttle is being thrown from the shuttle-presenter, substantially as described.

16. In a loom, a lay having a picker-slot made vertically therein, combined with a running-shuttle box composed of a wall occupying a position at one side of said slot, said wall having at its upper edge a horizontally-extended lip to more or less overlap only the top of the shuttle, and having at its lower edge a suitable ear which is extended horizontally therefrom across the said picker-slot and rods connected to said box and extended through guides in said lay, and means to move said rods and box vertically, substantially as described.

17. In a loom, the following instrumentalities, viz: a lay having a vertical slot or passage for a picker-stick, and presenting at the front side of said slot a shuttle-supporting table having a notch at either end, and a wall erected on said lay at the rear side of said slot; a running-shuttle box presenting a wall at the front side of said slot, the latter wall having a lip at its top edge to overlap more or less of the top of the shuttle, and having at its lower edge a lip and two ears to enter said notches, said lip being located wholly at one side of said slot; means to move said running-shuttle box on said lay to cause the lip at its under edge to lift the shuttle from the lay and put it into a position above the wall erected on said lay, and a picker-stick working in said slot between said ears, substantially as described.

18. In a loom, the following instrumentalities, viz: a lay having a horizontal alining-surface coincident with the level of the race of the lay and provided with a vertical slot or passage for a picker-stick, a wall erected on said lay at one side of said slot, a running-shuttle box presenting a wall at the opposite side of said slot, the latter wall having a lip at its top edge to overlap more or less of the top of said shuttle, and having at its lower end a lip to enter said notch, said lip being located at one side of said slot, and means to move said running-shuttle box on said lay to cause said lower lip to lift the shuttle from the horizontal alining-surface of the lay, and put it in position above the wall erected on said lay, and a picker-stick working in said slot, substantially as described.

19. In a loom, a lay having a horizontal alining-surface coincident with the level of the race of the lay and on which said shuttle rests when thrown therefrom, said horizontal alining-surface constituting the bottom of a shuttle-box, a running-shuttle box having a substantially vertical wall, and a lip at its upper edge to partially overlap the top of the shuttle, and a lip at its lower edge located at one side of said running-shuttle box, said shuttle-box being open at its inner side for the discharge of the shuttle; and a wall rising from said lay at the opposite side of said slot against which one side of the shuttle is borne, and a binder in one of said walls, combined with means to move said running shuttle into its inoperative position and place its open side above said wall, whereby the shuttle carried thereby is free to fall out of said box over said wall, substantially as described.

20. In a loom, the following instrumentalities, viz: a lay, a running-shuttle box carried thereby and occupying normally its inoperative position; a lever, an auxiliary-shuttle presenter actuated thereby and occupying normally its inoperative position, a device free to slide longitudinally with relation to the lever carrying the said auxiliary-shuttle presenter, and means to move said device and said running-shuttle box, the movement of the device in unison with the running-shuttle box causing the auxiliary-shuttle presenter to meet the forwardly-moving lay, substantially as described.

21. In a loom, the following instrumentalities, viz: a lay having a horizontal slotted alining-surface coincident with its raceway; a reed carried by said lay; a running-shuttle box open at its rear side for the passage therefrom of a shuttle to be discharged from the loom, the wall of said shuttle-box nearest the breast-beam occupying a position parallel to the line occupied by the faces of the dents of the reed, to constitute a fixed alining-surface; a binder pivoted on said lay at the rear side of said picker-slot, and acting on the shuttle opposite it to aline it against said alining-surface, means to throw the shuttle, and means to move said running-shuttle box to elevate its open rear side above said binder, in order that the shuttle may escape therefrom over said binder, substantially as described.

22. A lay having a horizontal alining-surface provided with a vertical slot for the reception of a picker-stick, a vertical picker-stick movable in said slot, a running-shuttle box having a slot in its under side for the reception of said picker-stick, and means to lift said shuttle-box, substantially as described.

23. The lay having a vertical alining surface or wall to aline the shuttle with the reed, and a horizontal alining-surface coincident with the race of the lay to sustain the shuttle as it is being thrown, an auxiliary-shuttle presenter made as a lever, a device to move said lever to place and hold temporarily a spare shuttle against said vertical alining-surface of the lay during a backward movement of the lay, and a picker to strike and throw said spare shuttle across the lay from between said vertical alining surface or wall and said spare shuttle-feeder.

24. In a loom, the following instrumentalities, viz: a lay having a horizontal shuttle-alining surface coincident with the level of the race of the lay to constitute the bottom of a shuttle-box to sustain the shuttle being thrown, a vertical rear wall carried by the lay to receive against it the rear side of the shuttle sustained by said horizontal alining-surface, a vertical front wall, a lever having an attached auxiliary-shuttle presenter, a rest or support for an auxiliary shuttle, means under the control of a filling-detector to move said vertical front wall from its operative position opposite said rear wall into its inoperative position to afford a free horizontal space leading to said rear wall, and actuating means for said auxiliary-shuttle presenter to cause it to place said auxiliary shuttle directly upon said horizontal alining-surface and against the rear wall of the lay while the spare shuttle is thrown from said alining-surface across the lay and through the shed, substantially as described.

25. In a loom, a vibratable lay presenting a vertical rear wall, and a horizontal alining-surface to guide a running shuttle; a rest to sustain an auxiliary shuttle, an auxiliary-shuttle presenter located at one side of an auxiliary shuttle sustained on said rest and normally standing in its inoperative stationary position at the loom side; combined with means when said running shuttle is to be changed to actuate said auxiliary-shuttle presenter and cause it to move the auxiliary shuttle from said rest upon the said horizontal alining-surface and against said rear wall in place of the running shuttle, and means to insure the movement of said auxiliary-shuttle presenter in unison with the lay while the auxiliary shuttle supported by said horizontal alining-surface is being thrown from between the wall of the said shuttle-presenter and the wall of the lay, substantially as described.

26. In a loom, a lay having at its end a horizontal alining-surface to support the under side of a running shuttle and constitute the bottom of a shuttle-box as said shuttle is being thrown across the lay and also to receive directly upon it a spare shuttle being put onto the lay, said lay having a wall at its rear side to aline the running shuttle with the reed preparatory to throwing said shuttle, and to also aline the spare shuttle for its first shot, a vertical wall near the front side of said horizontal alining-surface and occupying normally its operative position opposite the wall at the rear side of the lay, a support for a spare shuttle, an auxiliary-shuttle presenter normally held in its inoperative position near the breast-beam, means when a shuttle is to be changed to remove the wall near the front side of the lay from its normal position opposite the wall at the rear side of the lay, and to actuate said auxiliary-shuttle presenter to remove a spare shuttle from said spare-shuttle support and put it on the said horizontal alining-surface against the wall at the rear side of the lay, devices to retain the auxiliary-shuttle presenter and the lay together while the spare shuttle between said presenter and the wall of the lay is thrown from said horizontal alining-surface across the lay, and means thereafter to return said auxiliary-shuttle presenter into its normal stationary position and put the wall at the front side of the lay again in its operative position to cooperate with the spare shuttle as it returns to the end of the lay from which it started to become the running shuttle, substantially as described.

RANDOLPH CROMPTON.
HORACE WYMAN.

Witnesses:
GEO. W. GREGORY,
E. L. PARMENTER.